(12) United States Patent
Oliver

(10) Patent No.: US 7,895,738 B2
(45) Date of Patent: Mar. 1, 2011

(54) APPARATUS AND SYSTEM PART ASSEMBLY FASTENERS

(75) Inventor: Richard T. Oliver, Westfield, IN (US)

(73) Assignee: Porter Group, LLC, Novi, MI (US)

( * ) Notice: Subject to any disclaimer, the term of this patent is extended or adjusted under 35 U.S.C. 154(b) by 1140 days.

(21) Appl. No.: 11/560,376

(22) Filed: Nov. 16, 2006

(65) Prior Publication Data

US 2008/0115340 A1     May 22, 2008

(51) Int. Cl.
*B23P 19/00* (2006.01)

(52) U.S. Cl. ............. 29/759; 29/760; 29/761; 29/243.5; 29/33 P; 72/404; 72/405.06; 198/346.2

(58) Field of Classification Search ................. 29/243.5, 29/564.6, 33 Q, 332, 705, 710–715, 742, 29/759–761; 198/341.01, 346.2, 775, 47.1; 72/404, 405.5
See application file for complete search history.

(56) References Cited

U.S. PATENT DOCUMENTS

| | | | |
|---|---|---|---|
| 3,067,496 A * | 12/1962 | Rayburn | ........................ 29/743 |
| 3,557,425 A | 1/1971 | Scharf | |
| 3,704,502 A * | 12/1972 | Meyers et al. | .................. 29/705 |
| 4,246,815 A | 1/1981 | Hugo | |
| 4,501,179 A | 2/1985 | Iwata | |
| 4,583,634 A | 4/1986 | Kraus et al. | |
| 4,767,298 A * | 8/1988 | Bocchicchio et al. | ........ 425/112 |
| 4,783,889 A | 11/1988 | Hayashi | |
| 4,914,996 A | 4/1990 | Lavorel | |
| 4,967,471 A | 11/1990 | Noguchi et al. | |
| 5,105,857 A | 4/1992 | Ellis | |
| 5,244,073 A | 9/1993 | Mori et al. | |
| 5,335,702 A | 8/1994 | Goto | |
| 5,479,853 A | 1/1996 | Carroll et al. | |
| 5,570,494 A | 11/1996 | Prince, Jr. | |
| 5,970,754 A | 10/1999 | Polato | |
| 6,662,067 B1 | 12/2003 | Xu et al. | |
| 2002/0029670 A1 | 3/2002 | Long et al. | |
| 2003/0121758 A1 | 7/2003 | Spejna et al. | |
| 2008/0115340 A1 * | 5/2008 | Oliver | .......................... 29/33 K |

* cited by examiner

*Primary Examiner* — Minh Trinh

(74) *Attorney, Agent, or Firm* — Brooks Kushman P.C.

(57) ABSTRACT

Staking apparatus (22) and a method for staking one or more fasteners (44) of a part assembly (18) are provided by a conveyor (14), a lower lift and lock assembly (24) including a lower lifter (28) and a lower lock (30), and an upper press (26). Lower and upper staking punches (40, 60) of the lower lifter (28) and the upper press (26), respectively, provide the staking while at least one and preferably a plurality of springs (36) resiliently support a pallet assembly (16) on which the part assembly (18) is positioned.

8 Claims, 4 Drawing Sheets

APPARATUS AND SYSTEM PART ASSEMBLY FASTENERS

BACKGROUND OF THE INVENTION

1. Field of the Invention

This invention relates to apparatus and a method for staking fasteners of a part assembly so as to secure components of the part assembly to each other.

2. Background Art

Certain part assemblies such as vehicle seat latches have components that include spaced plates as well as latching members positioned between the plates and often on the outer side of one or both plates. The plates and such other latching members are normally secured to each other by staking which forms at least one head on each fastener so as to provide securement thereof to the associated component or components.

Assembly lines for part assemblies conventionally have a direction of conveyance along which a conveyor conveys pallets that support the part assemblies for staking operations at a plurality of staking stations. Usually the pallets are moved transversely from the conveyor for the staking operation which requires lateral movement instead of staking at a location along the direction of conveyance. Such lateral movement is first from the conveyor and then after the staking back to the conveyor such that the time involved in the staking includes the time of such lateral movement.

Patents and applications noted during an investigation conducted in connection with the present invention include: U.S. Pat. No. 4,501,179 Iwata; U.S. Pat. No. 4,583,634 Kraus et al.; U.S. Pat. No. 4,783,889 Hayashi; U.S. Pat. No. 5,244,073 Mori et al.; U.S. Pat. No. 5,479,853 Carroll et al.; U.S. Pat. No. 5,570,494 Prince, Jr.; and U.S. Pat. No. 6,662,067 Xu et al.; and United States Patent Application Publication US 2003/0121758.

SUMMARY OF THE INVENTION

An object of the invention is to provide improved apparatus for staking fasteners.

In carrying out the above object, the apparatus for staking fasteners in accordance with the invention includes a conveyor for conveying part pallets along a conveying axis with the part pallets respectively supporting part assemblies that each have at least one fastener to be staked to provide processing of the part assembly. A staking station of the apparatus has each part pallet conveyed thereto by the conveyor with the associated part assembly supported on the pallet. The staking station includes a lower lift and lock assembly and also includes an upper press. The lower lift and lock assembly includes a lower lifter that is movable upwardly and downwardly and has at least one spring that resiliently lifts the pallet upwardly from the conveyor by the upward movement. The lower lifter also includes at least one lower staking punch for staking the fastener of the part assembly. The lower lift and lock assembly also includes a lower lock that is movable from an unlocked position to a locked position to provide support to the upwardly moved lower lifter that resiliently supports the pallet by the spring. The upper press is movable downwardly toward the upwardly moved lower lifter with the lower lock in its locked position and has at least one upper staking punch that cooperates with the lower staking punch of the lower lifter to provide staking of the fastener of the part assembly.

The lower lifter preferably includes a plurality of springs for resiliently lifting the pallet upwardly from the conveyor upon the upward movement of the lower lifter. Also, the lower lifter as disclosed includes a plurality of lower staking punches for respectively staking associated fasteners of the part assembly, and the upper press includes a plurality of upper staking punches for respectively cooperating with the lower staking punches to provide staking of the fasteners of the part assembly upon the downward movement of the upper press.

The lower lock preferably includes at least one lock member that is movable from the unlocked position adjacent the lower lifter to the locked position below the lower lifter to provide support thereto during the downward movement of the upper press for the staking of the fastener. More specifically, the lower lock includes a pair of lock members that are respectively movable in opposite directions from the unlocked position on opposite sides of the lower lifter to the locked position below the lower lifter to cooperatively provide support thereto during the downward movement of the upper press for the staking of the fastener. Also, the pair of lock members are preferably movable along the direction of the conveying axis between the unlocked and locked positions.

Each staking punch as disclosed includes a resilient bushing for initially contacting the part assembly during the staking processing.

A system for staking fasteners in accordance with the invention includes a plurality of the staking stations.

Another object of the invention is to provide an improved method for staking a fastener of a part assembly.

In carrying out the immediately preceding object, the method for staking a fastener of a part assembly in accordance with the invention is performed by conveying the part assembly and the fastener thereof on a pallet along a direction of conveyance to a staking station. The pallet and the part assembly thereon as well as the fastener of the part assembly are then resiliently lifted upwardly from the conveyor to a location between lower and upper staking punches. Relative movement of the lower and upper staking punches toward each other stakes the fastener of the part assembly, and the pallet and the staked part assembly thereon is then lowered downwardly onto the conveyor for conveyance from the staking station.

The pallet is disclosed as being lifted from the conveyor by upwardly moved springs. The lower staking punch has a resilient bushing that contacts the part assembly from below during the staking, and the upper staking punch has a resilient bushing that contacts the upper part assembly from above during the staking.

The lower staking punch as disclosed is supported by a lower lifter for the staking and the upper staking punch is moved downwardly to provide the relative movement of the lower and upper staking punches toward each other to stake the fastener of the part assembly. More specifically, the lower staking punch is supported by a lower lifter that also includes springs for resiliently lifting the pallet upwardly from the conveyor upon upward movement of the lower lifter. Furthermore, a lower lock moves at least one lock member from an unlocked position adjacent the lower lifter to a locked position below the lower lifter to support the lower lifter during the staking provided by the downward movement of the upper staking punch. More specifically, the lower lock as disclosed includes a pair of lock members that are moved in opposite directions to each other from an unlocked position on opposite sides of the lower lifter to a locked position below the lower lifter to support the lower lifter during the staking provided by the downward movement of the upper staking punch. Also the pair of lock members as disclosed are moved along the direction of conveyance between the locked and unlocked positions.

In the preferred practice of the method as disclosed, the relative movement of a plurality of lower and upper punches toward each other respectively stake a plurality of fasteners of the part assembly.

The objects, features and advantages of the present invention are readily apparent from the following detailed description of the preferred embodiment when taken in connection with the accompanying drawings.

DETAILED DESCRIPTION OF THE PREFERRED EMBODIMENT

Figure 1:
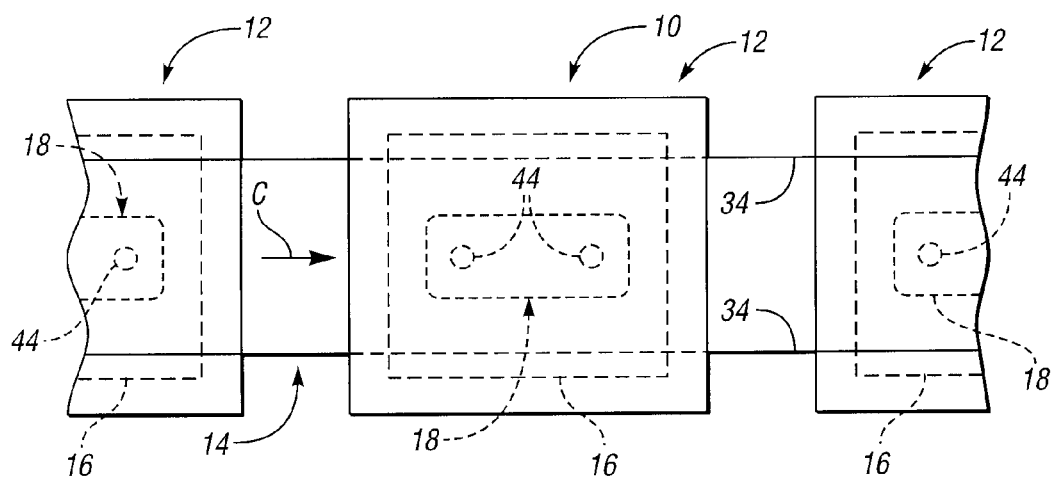
FIG. 1 is a top schematic view of a system having apparatus for staking fasteners of part assemblies in accordance with the present invention.

With reference to FIG. 1, a part assembly staking system is generally indicated by 10 and includes staking stations 12 and a schematically indicated conveyor 14 that provides conveyance of part pallets 16 along a direction of conveyance C between the staking stations. Each part pallet 16 carries an associated part assembly 18 having at least one fastener to be staked as is hereinafter more fully described. The staking system 10 will conventionally also include buffer stations between the staking stations and the part assemblies may have many fasteners that are staked after passing through all of the staking stations 12.

Figure 2:
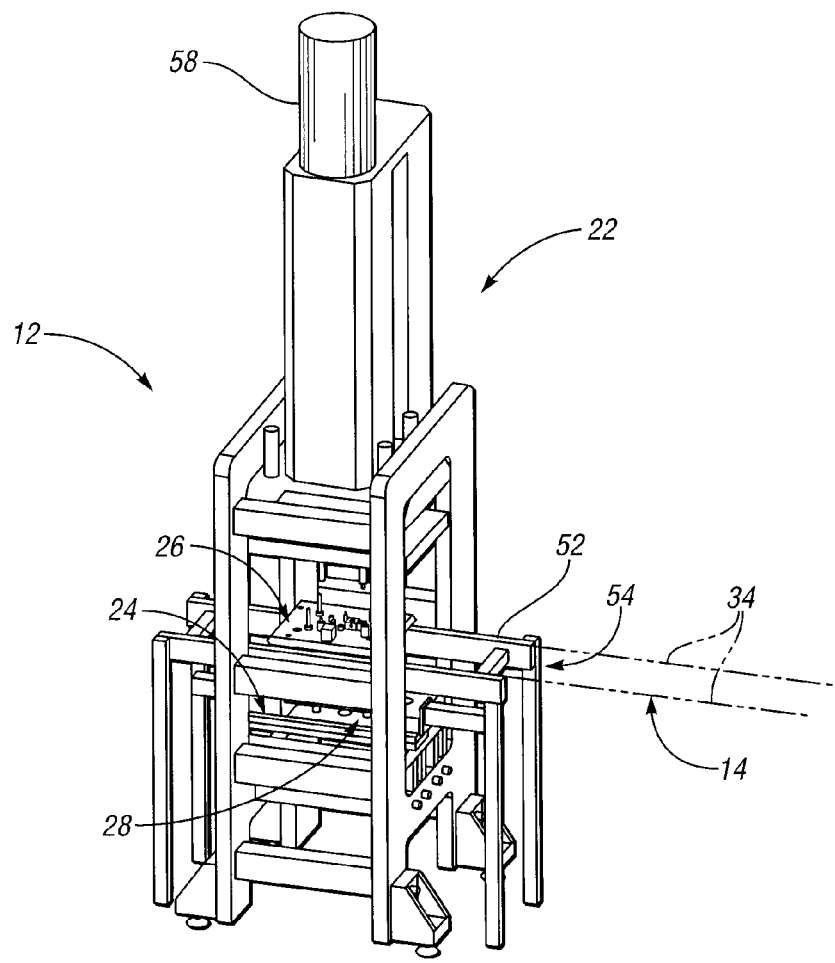
FIG. 2 is a perspective view of a staking station of the system for providing part assembly fastener staking.

With reference to FIG. 2, each staking station includes apparatus 22 constructed in accordance with the invention to perform the staking method of the invention. Both the apparatus 22 and the staking method will be described in an integrated manner to facilitate an understanding of all aspects of the invention.

Figure 3:
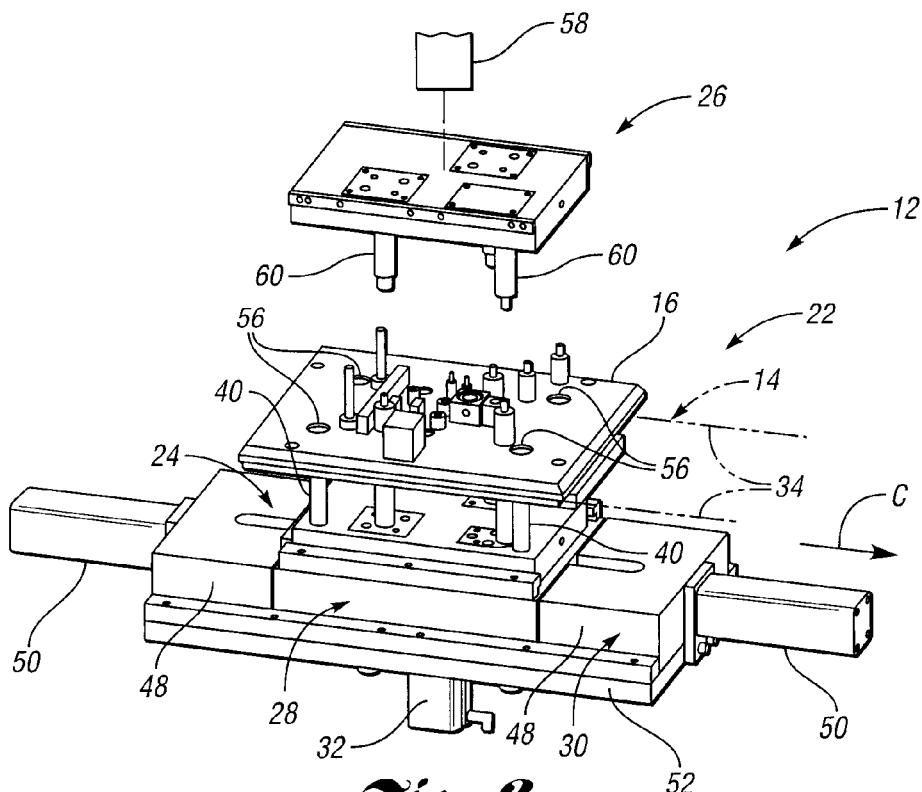
FIG. 3 is a partial exploded perspective view of the staking apparatus which includes a lower lift and lock assembly and an upper press which are shown with the lower lift and lock assembly in a lowered and unlocked position.
Figure 4:
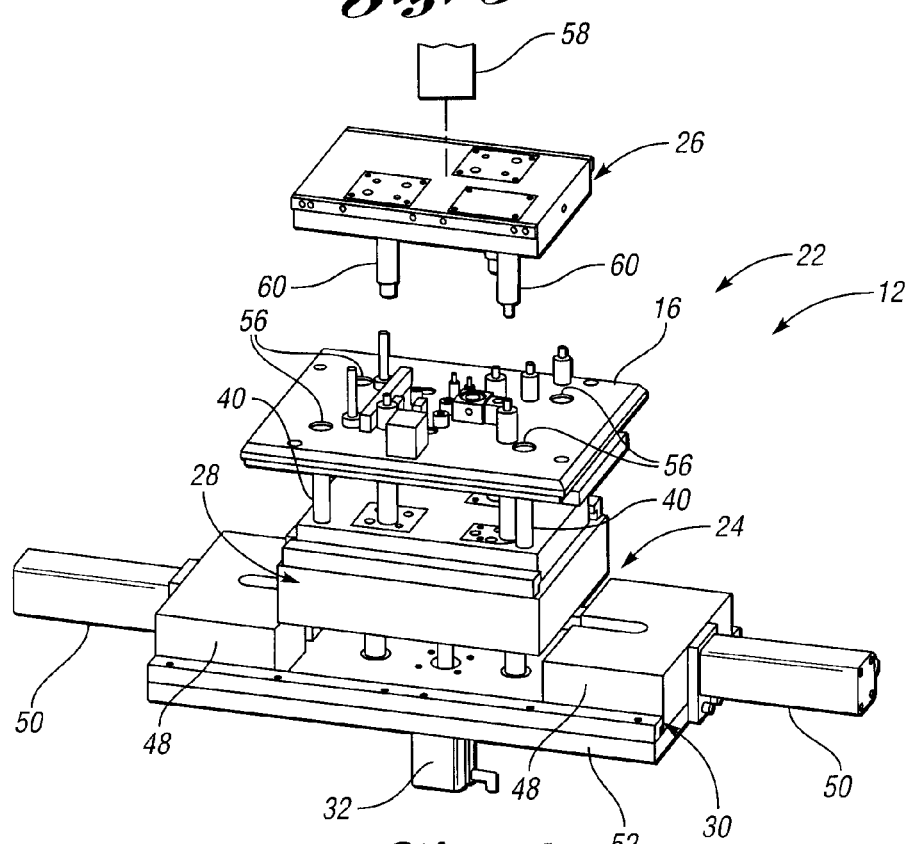
FIG. 4 is a perspective view similar to FIG. 3 but showing the lower lifter moved upwardly to a raised position.
Figure 5:
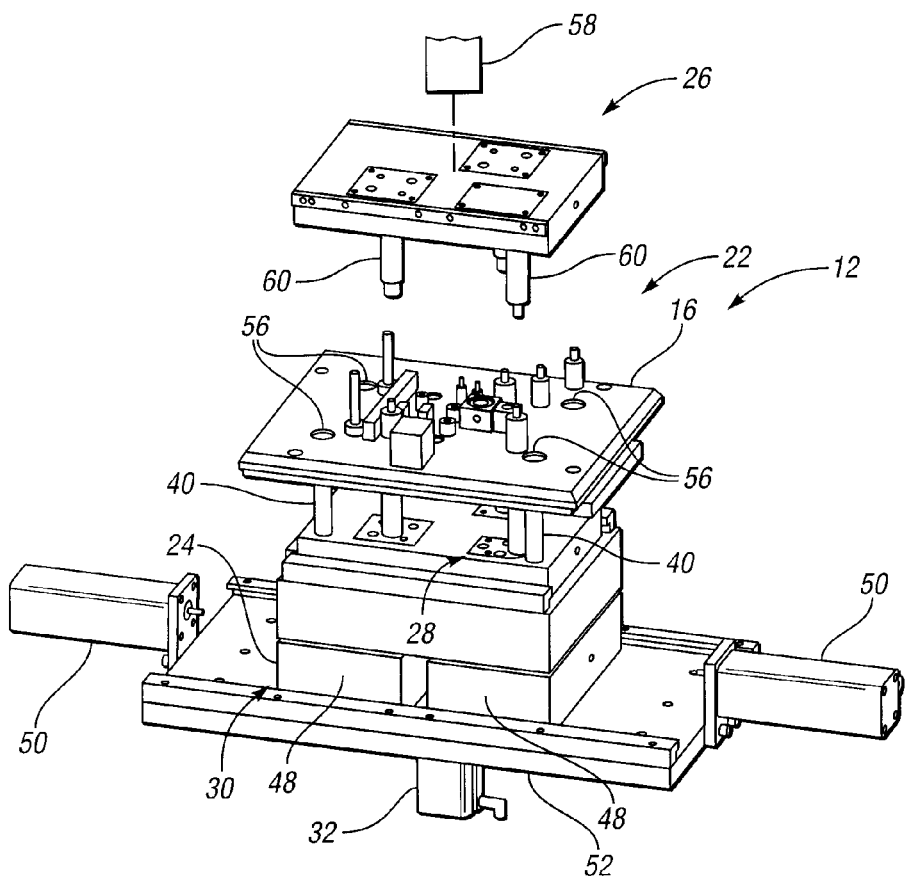
FIG. 5 is a view similar to FIG. 4 after a lock of the lower lift and lock assembly has been moved from an unlocked position to a locked position to support the lower lifter during the staking operation.

With continued reference to FIG. 2 and additional reference also to FIGS. 3-5, the staking apparatus 22 in addition to the conveyor 14 includes a lower lift and lock assembly 24 and an upper press 26.

The lower lift and lock assembly 24 as shown in FIGS. 3-5 includes a lower lifter 28 and a lower lock collectively indicated by 30.

Figure 7:
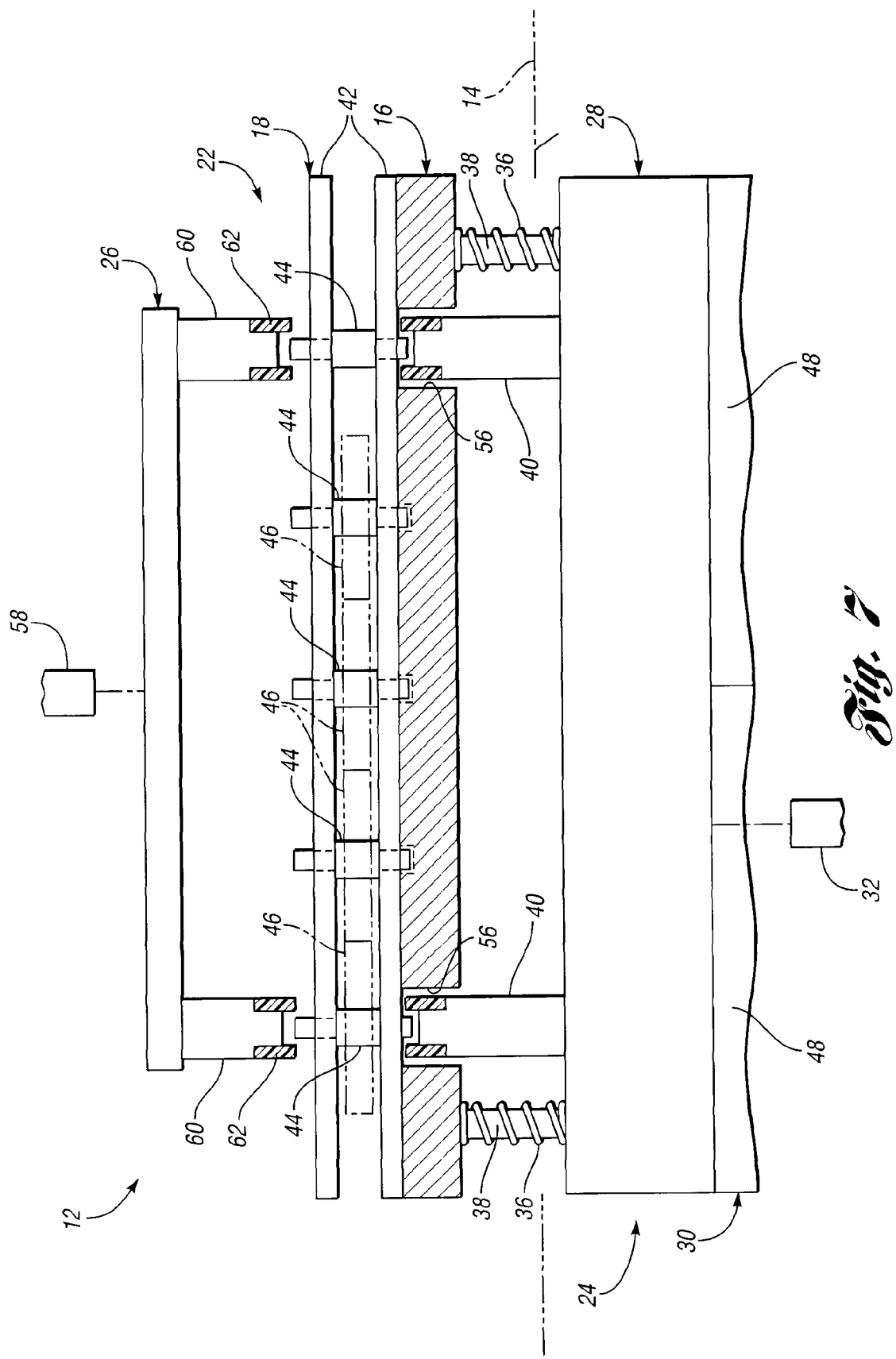
FIG. 7 is a schematic view illustrating the lower lift and lock assembly and the upper press that perform the staking.

The lower lifter 28 is movable upwardly and downwardly by an actuator 32 such as a pneumatic cylinder between the lower position of FIG. 3 and the raised position of FIG. 4 to lift the pallet 16 upwardly from spaced side reaches 34 of conveyor 14. After the staking as is hereinafter more fully described, the actuator 32 lowers the lower lifter 28 back to the lowered position of FIG. 3 to redeposit the pallet 16 on the conveyor 14 for movement from the staking station in preparation for receiving another pallet to commence the next cycle. As best illustrated in FIG. 7, the lower lifter 28 includes at least one spring 36 and preferably includes a plurality of the springs for resiliently lifting the pallet 16 upwardly from the conveyor 14 under the impetus of the actuator 32 (FIGS. 3-5). Each spring 36 as shown in FIG. 7 is of the helical type and encircles a guide post 38 extending slightly upwardly therefrom to resiliently contact the lower side of the pallet 16 during the upward movement that provides the pallet lifting. The lower lifter 28 also includes at least one and preferably includes a plurality of staking punches 40 to provide the staking from below the pallet.

With continuing reference to FIG. 7, the part assembly 18 is disclosed as including lower and upper plates 42 that are spaced from each other and as also including fasteners 44 to be staked. As illustrated, two of the fasteners 44 are staked at the illustrated staking station and there are other fasteners which are staked at the other stations. These fasteners in addition to securing the plates 42 to each other provide for mounting of latching components collectively indicated by 46 in phantom line representation. As previously mentioned, the latching components are located between the spaced plates and can also be located on outer sides of the plates. When the components are on the lower side of the lower spaced plate 42, suitable recessing of the pallet is required to receive the component(s) for proper positioning.

The lower lock 30 illustrated in FIGS. 3-5 and 7 includes at least one lower lock member 48 and as illustrated includes a pair of the lower lock members 48 which have an unlocked position where they are located on opposite sides of the lowered lower lifter 28 spaced from each other along the direction of conveyance C. Upward movement of the lower lifter 28 from the position of FIG. 3 to the position of FIG. 4 to lift the pallet 16 from the conveyor 14 raises the lower lifter slightly above the upper extremity of the lower lock members 48 which are then moved horizontally in opposite directions along the direction of conveyance C by associated actuators 50 toward each other to below the lower lifter 24 as shown in FIG. 5. The lower lifter actuator 32 then lowers the lower lifter 28 downwardly onto the lower lock members 48 which move horizontally along a horizontal rigid base 52 of the apparatus framework 54 as best shown in FIG. 2. The lower lock members 48 of the lower lock 30 as shown in FIGS. 5 and 7 provide rigid support to the upwardly moved lower lifter 28 for the staking operation which is hereinafter more fully described in connection with FIG. 7 which shows the lower staking punches 40 as being aligned with pallet openings 56 so as to have access to the associated fasteners 44 to be staked from the lower side of the part assembly 18.

Figure 6:
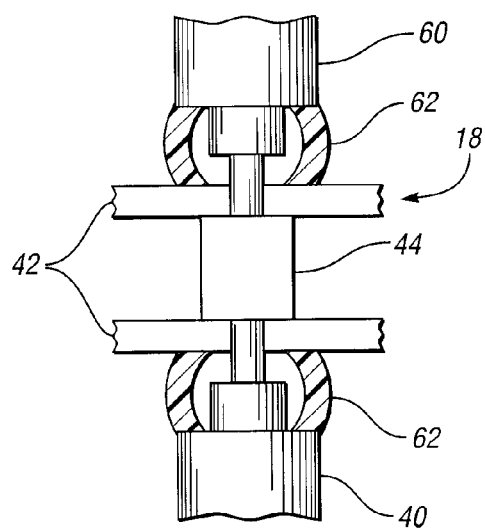
FIG. 6 is a partial view that illustrates the manner in which a fastener is staked between lower and upper staking punches which have resilient bushings that extend around the fastener being staked.

As shown in FIGS. 2-5 and 7, the upper press 26 includes an actuator 58 for providing vertical movement preferably by a hydraulic cylinder that moves the upper press downwardly for the staking operation and then moves it then back upwardly in preparation for the next cycle. The upper press includes a pair of upper staking punches 60 that are aligned with the lower staking punches 40 as shown in FIG. 7. Downward movement of the upper press 26 by the actuator 58 initially contacts the upper staking punches 60 with the aligned fasteners 44 from above and moves the part assembly 18 and pallet 16 downwardly against the resilient bias of the springs 36 supported by the lower lifter 28. The fasteners 44 then move downwardly and contact the lower staking punches 40 while both the part assembly and the pallet are resiliently supported which insures proper positioning of the fasteners 44 without any cocking during the staking. More specifically as shown in FIG. 6, each of the lower and upper staking punches 40 and 60 includes a resilient bushing 62 that contacts the adjacent side of the part assembly 18 to provide proper positioning during the staking operation.

After the staking operation, the lower lock 30 is moved from the position of FIG. 7 to the position of FIG. 4 by the actuators 50 so the lower lifter 28 can be moved downwardly by its actuator 32 back to the position of FIG. 3 to redeposit the pallet 16 and the staked part assembly 18 on the conveyor 34 for movement from the staking station and movement of another pallet into the staking station for commencement of the next staking cycle.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. Apparatus for staking fasteners, comprising:
   a conveyor for conveying part pallets along a conveying axis with the part pallets respectively supporting part assemblies that each have at least one fastener to be staked to provide processing of the part assembly;
   a staking station to which the conveyor conveys each part pallet with the associated part assembly supported thereon, and the staking station including a horizontal rigid base, a lower lift and lock assembly, and an upper press;
   the lower lift and lock assembly including a lower lifter that is movable upwardly and downwardly, the lower lifter including at least one spring that resiliently lifts the pallet upwardly from the conveyor by the upward movement, and the lower lifter also including at least one lower staking punch for staking the fastener of the part assembly;
   the lower lift and lock assembly also including a lower lock including a pair of lock members that are respectively movable horizontally on the horizontal rigid base in opposite directions from unlocked positions on opposite sides of the lower lifter to locked positions below the upwardly moved lower lifter to cooperatively provide support on the horizontal rigid base to the upwardly moved lower lifter that resiliently supports the pallet by the spring; and
   the upper press being movable downwardly toward the upwardly moved lower lifter with the pair of lock members of the lower lock in their locked positions, and the upper press having at least one upper staking punch that cooperates with the lower staking punch of the lower lifter to provide staking of the fastener of the part assembly.

2. The apparatus for staking fasteners as in claim 1 wherein the lower lifter includes a plurality of springs for resiliently lifting the pallet upwardly from the conveyor upon the upward movement of the lower lifter.

3. The apparatus for staking fasteners as in claim 1 where the lower lifter includes a plurality of lower staking punches for respectively staking associated fasteners of the part assembly, and the upper press including a plurality of upper staking punches for respectively cooperating with the lower staking punches to provide staking of the fasteners of the part assembly upon the downward movement of the upper press.

4. The apparatus for staking fasteners as in claim 1 wherein the lower lifter includes a plurality of springs for resiliently lifting the pallet upwardly from the conveyor upon the upward movement of the lower lifter, the lower lifter including a plurality of lower staking punches for respectively staking associated fasteners of the part assembly, and the upper press including a plurality of upper staking punches for respectively cooperating with the lower staking punches to provide staking of the fasteners of the part assembly upon the downward movement of the upper press.

5. The apparatus for staking fasteners as in claim 1 wherein the pair of lock members are movable along the direction of the conveying axis between the unlocked and locked positions.

6. The apparatus for staking fasteners as in claim 1 wherein each staking punch includes a resilient bushing for initially contacting the part assembly during the staking processing.

7. Apparatus for staking fasteners, comprising:
   a conveyor for conveying part pallets along a conveying axis with the part pallets respectively supporting part assemblies that each have fasteners to be staked to provide processing of the part assembly;
   a staking station to which the conveyor conveys each part pallet with the associated part assembly supported thereon, and the staking station including a horizontal rigid base, a lower lift and lock assembly, and an upper press;
   the lower lift and lock assembly including a lower lifter that is movable upwardly and downwardly, the lower lifter including springs that resiliently lift the pallet upwardly from the conveyor by the upward movement, and the lower lifter also including lower staking punches for respectively staking the fasteners of the part assembly;
   the lower lift and lock assembly also including a lower lock including a pair of lock members that are movable horizontally on the horizontal rigid base in opposite directions from unlocked positions on opposite sides of the lower lifter to locked positions below the upwardly moved lower lifter to cooperatively provide support on the rigid base to the upwardly moved lower lifter that resiliently supports the pallet by the springs above the conveyor; and
   the upper press being movable downwardly toward the upwardly moved lower lifter with the pair of lock members of the lower lock in their locked positions, and their upper press having a plurality of upper staking punches that cooperate with the lower staking punches of the lower lifter to respectively provide staking of the fasteners of the part assembly.

8. A system for staking fasteners, comprising:
   a plurality of staking stations;
   a conveyor for conveying part pallets along a conveying axis through the staking stations with the part pallets respectively supporting part assemblies that each have fasteners to be staked at the staking stations to provide processing of the part assemblies; and
   each staking station including a horizontal rigid base, a lower lift and lock assembly, and an upper press;
   each lower lift and lock assembly including a lower lifter that is movable upwardly and downwardly, the lower lifter including springs that resiliently lift each pallet at the associated staking station upwardly from the conveyor by the upward movement, and the lower lifter also including at least one lower staking punch for staking an associated fastener of the part assembly;
   each lower lift and lock assembly also including a lower lock having a pair of lock members that are movable horizontally on the horizontal rigid base in opposite directions from unlocked positions on opposite sides of the lower lifter to locked positions below the upwardly moved lower lifter to cooperatively provide support on the horizontal rigid base to the upwardly moved lower lifter which resiliently supports the pallet by the springs; and the upper press being movable downwardly toward the upwardly moved lower lifter with the pair of lock members of the lower lock in their locked positions, and the upper press having at least one upper staking punch that cooperates with the lower staking punch of the lower lifter to provide staking of the fastener of the part assembly.

\* \* \* \* \*